(12) United States Patent
Bouat

(10) Patent No.: US 7,653,406 B2
(45) Date of Patent: Jan. 26, 2010

(54) ENABLING A PARTICIPANT OF A COMMUNICATION SESSION TO INITIATE A COMMUNICATION ACCORDING TO ANOTHER COMMUNICATION SERVICE

(75) Inventor: Sebastien Bouat, St Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 679 days.

(21) Appl. No.: 11/388,371

(22) Filed: Mar. 23, 2006

(65) Prior Publication Data

US 2006/0234746 A1    Oct. 19, 2006

(30) Foreign Application Priority Data

Mar. 31, 2005    (EP)    ................................. 05300239

(51) Int. Cl.
*H04W 4/10*    (2009.01)
(52) U.S. Cl. ....................... 455/519; 455/466
(58) Field of Classification Search .................. None
See application file for complete search history.

(56) References Cited

U.S. PATENT DOCUMENTS

2003/0152040 A1    8/2003    Crockett et al.

2004/0057449 A1*    3/2004    Black .......................... 370/432

FOREIGN PATENT DOCUMENTS

WO    WO2004086715    10/2004

OTHER PUBLICATIONS

Medman N., "Ericsson Instant Talk" on Ericsson Review, Ericsson Stockholm, SE, No. 1, pp. 16-19 (2004, month of publication unknown).
Meyer, R., "Push-to-Talk IM GSM-NETZ Fuer Die Professionaelle Nutzung," NTZ (Nachrichtentechnische Zeitschrift), VDE Verlag GMBH, Berlin, DE; vol. 57, No. 6, Jun. 2004, pp. 22-24.
EP Search Report (EP Appl. No. 05300239.0) dated Nov. 30, 2005 (8 pages).

* cited by examiner

*Primary Examiner*—Philip J Sobutka

(57) ABSTRACT

A method is provided to enable a participant of a communication event established using a first communication service to initiate a communication with at least one other participant of the communication event using a second communication service. The method includes receiving, from the participant of the communication event, a communication, the communication being received via the second communication service, determining at least one other current participant of the communication event, and initiating at least one other communication with at least the other current participant.

18 Claims, 3 Drawing Sheets

ENABLING A PARTICIPANT OF A COMMUNICATION SESSION TO INITIATE A COMMUNICATION ACCORDING TO ANOTHER COMMUNICATION SERVICE

RELATED APPLICATIONS

This application for letters patent is related to and claims the benefit of an earlier filing date and right of priority of foreign filed patent application EP05300239.0, filed in the European Patent Office on Mar. 31, 2005, titled "Improvements in or Relating to Communications", which is also hereby incorporated by reference.

BACKGROUND

As communication devices, such as mobile telephones, and communication networks become increasing sophisticated there are an increasing number of communication services being offered to consumers. Such communication services include short message system (SMS) messaging, multimedia messaging (MMS), instant messaging (IM), push-to-talk (PTT), and the like.

In order for a communication device, such as a mobile telephone, to be able to provide access to such communication services a mobile telephone typically needs to have a corresponding client application installed thereon. The client application provides a user interface to the service as well as a suitable interface for communicating with a network based server application providing the service.

Once a mobile telephone has been designed and manufactured, it is expensive for the network operators and the handset manufacturers to modify the software applications present thereon to accommodate improved services or improved functionality. Thus, from an economic point of view at least, it is somewhat undesirable to provide upgrades to existing mobile telephones, unless it is deemed that the improvements represent a significant revenue source or provide substantial benefits for the network operator or the handset manufacturer.

The communication services available to mobile telephone users may be divided broadly into two categories: session-based and session-less services. For example, SMS and MMS are considered as session-less communication services. In other words, a user may send an SMS message to one or more other users, or may receive an SMS from one or more other users. However, each message sent or received is treated independently, and there is no concept of a 'session' between separate SMS messages, for example. Other communication services, however, such as push-to-talk, are session-based. For example, a push-to-talk session exists between multiple users when a push-to-talk communication is established until the push-to-talk communication is terminated.

Generally, as communication services become more sophisticated users demand higher levels of functionality and interoperability between different communication services. For instance, it may be desirable that users of session-based communication services be able to 'share' details of the session with another session-based or session-less communication service. For example, a user in a push-to-talk session may wish to, whilst participating in the push-to-talk session, send an SMS message to each of the current participants to the session. However, there is currently no easy way to achieve this. The only current known way is for the user to manually determine the current participants of the PTT session using the PTT client application, and to manually address an SMS message to each of the determined participants using an SMS client application. This is particularly inconvenient to the user, especially where the number of users in a session is large, and where the users in a session may join and leave the session at different times, making it difficult for a user to precisely determine exactly who is participating in a session at any given time.

One of the reasons for this is that different client applications on the same mobile telephone are typically independent from one another and generally lack any means of communication between them. Thus typically an SMS client application has no way of communicating with the push-to-talk client application for determining the current users of the session.

One way of overcoming this problem would be to redesign the client applications to provide the necessary interoperability. However, as previously mentioned, upgrading existing handsets is somewhat undesirable. Even if such a redesign were to take place, such improved client applications would typically only be available on new mobile telephones, leaving the vast majority of legacy mobile telephones unable to take advantage of such improvements.

Consequently, there is a need to provide a way of enabling users of mobile telephones to 'share' sessions between different communication services, without requiring modification to existing client applications.

BRIEF DESCRIPTION OF THE DRAWINGS

An embodiment of the present invention will now be described, by way of example only, with reference to the accompanying diagrams, in which.

DETAILED DESCRIPTION

Figure 1:
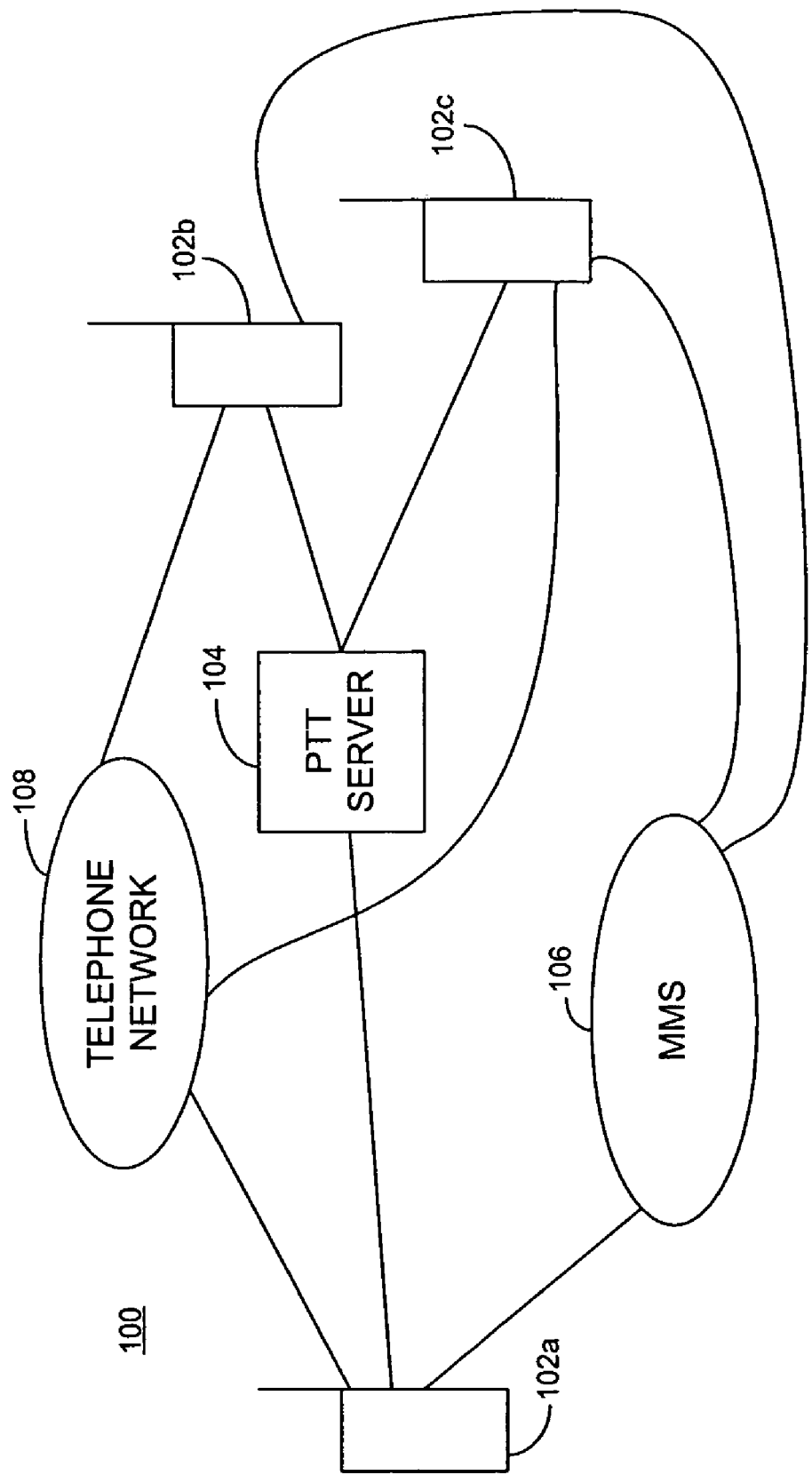
FIG. 1 is a block diagram showing a communication system according to the prior art.

Referring now to FIG. 1, there is shown a block diagram of a system according to the prior art. FIG. 1 shows a mobile telephone 102*a* that comprises a number of client applications (not shown) enabling the user of the mobile telephone 102*a* to access a number of different communication services, such as push-to-talk services, SMS services, MMS services, and the like. Through a separate client application (not shown) the mobile telephone 102*a* is also able to provide conventional mobile telephony services, through a mobile telephony network 108 as is well understood in the art.

For example, in order for the user of the mobile telephone 102*a* to establish a push-to-talk communication session the user selects, through the user interface provided by the PTT client application, one or more participants to invite to the session from a list of available contacts or buddies. To initiate the session the user actuates an appropriate button on the mobile telephone 102*a* to initiate the call. This causes an appropriate message, such as a PTT Call Setup type message to be sent to the PTT server 104. The PTT call setup message contains appropriate addressing or contact details of the invited participants. The PTT sever 104 then establishes, or attempts to establish, a PTT session with the invited participants and the inviter, as is well known in the art.

As mentioned above, one of the problems with current mobile telephones is that the client applications which provide access to the different communication services available are typically independent from one another.

Thus, if a user of the mobile telephone 102a is involved in a PTT session with the users of mobile telephones 102b and 102c, there is currently no way for the user to invoke a different communication service with the participants of the PTT session in a simple manner, as is explained in more detail below. For example, if a participant of a PTT session wishes to send an MMS message to the current participants of the PTT session this is problematic for a number of reasons.

For example, to send an MMS message to each of the current participants of a PTT session the user has to invoke the MMS message client application on his mobile telephone, to create the message to send and to address the message to each of the current participants of the PTT session. Thus, for each participant of the PTT session the user has to manually retrieve, for example from an electronic address book, the telephone subscriber number of each of the participants in the PTT session, and to add each telephone subscriber number to the distribution list of the MMS message.

Such a procedure is particularly inconvenient for the user, especially in the case where there are a large number of participants in the PTT session and where participants join and leave the session during the life of the session.

Thus, since the PTT and MMS client applications are typically substantially independent, there is no easy way for the user to perform the above-described operation in a simple and convenient manner.

From a user perspective, the situation is, therefore, currently somewhat frustrating.

Figure 2:
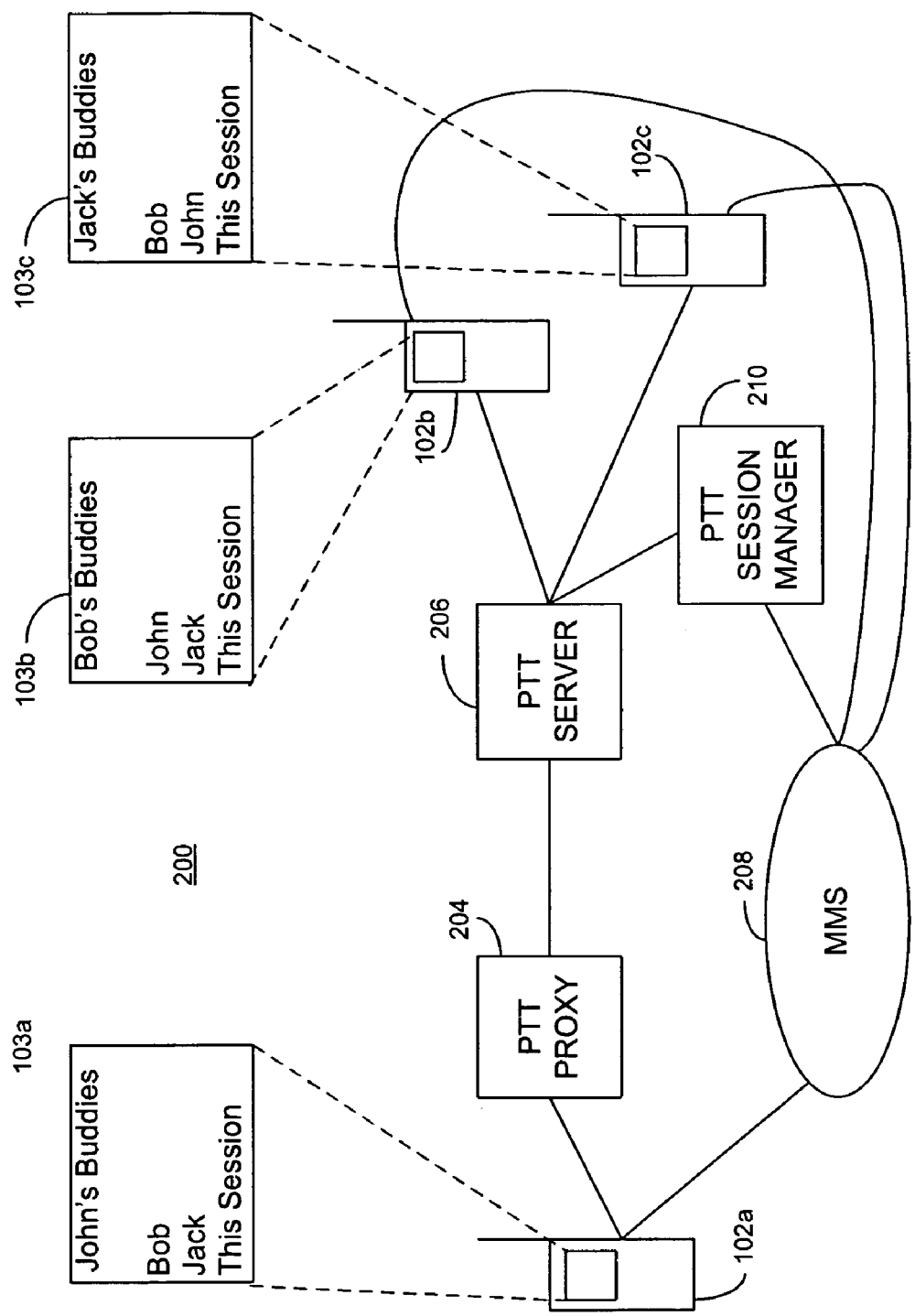
FIG. 2 is a block diagram showing a communication system according to an exemplary embodiment of the present invention.

Referring now to FIG. 2 there is shown a block diagram of a system 200 according to an embodiment of the present invention.

The user of the mobile telephone 102a creates a PTT session with mobile telephones 102b and 102c, for example as described above With reference to FIG. 1. The mobile telephone 102a may be configured such that PTT messages, such as a PTT call setup request, sent from the mobile telephone 102a are sent to a PTT proxy server 204.

The PTT proxy server 204 receives the PTT call setup request and adds an additional 'dummy' or pseudo participant to the request. The dummy participant preferably has a substantially unique displayed name (e.g. "This Session") such that the 'dummy' participant is easily recognizable for a user of a communication device. The 'dummy' participant also preferably has a globally unique identity, such as globally unique SIP address. The PTT proxy 204 forwards the PTT call setup request, including details of the additional dummy participant, to the PTT server 206. The PTT server 206 then attempts to establish a PTT session with the invited participants and the dummy participant, in the normal manner.

The created dummy participant is controlled and managed by a PTT session manager 210, and the SIP address of the dummy participant is assigned to the PTT session manager 210. The PTT session manager 210 includes a PTT client application suitable for enabling the dummy participant to be invited to and connected as a participant of a PTT session. However, any PTT voice messages sent to the PTT client application in the PTT session manager 210 may not be processed. Since the dummy participant behaves essentially like any other session participant, the PTT session manager 210 thus has access to the details of the current participants in the same way as any other participant to the call.

Once the PTT session is established, the dummy participant is visible, along with each of the other participants of the session, on the buddy list viewable on the mobile telephone of each participant, as shown, for example, at 103a, 103b and 103c.

From the user point of view far the dummy participant behaves exactly like any other participant to the session. The dummy participant can be used to represent the current PTT session, and may be arranged to appear on the buddy list using the assigned text identifier, such as "This Session", or something appropriate.

If one of the participants 102a, 102b or 102c wishes to send, for example, an MMS message to all of the other participants, the user opens his MMS client application, and copies the address details of the buddy "This Session" from his PTT interface and 'pastes' them to the interface of the MMS application. However, since the MMS client application requires a telephone subscriber number for addressing an MMS message the copy and paste operation must ensure that a valid telephone subscriber number is provided to the MMS application.

Depending on the particular user-interface provided, this may be achieved in a number of ways.

For example, where a simple user-interface is provided by the mobile telephone the text "This Session" used to identify the dummy participant could additionally include the SIP URI of the dummy participant which is arranged in the form of a telephone subscriber number. For example, the full text of the dummy participant could be:

"This Session +33123456@hp.com"

In this case, the user just has to select the telephone subscriber number portion of the buddy identifier, and to paste this into the MMS application.

A more sophisticated user-interface may enable a user to automatically copy just the telephone subscriber number part of a buddy identifier or SIP address. Those skilled in the art will appreciate that other techniques could also be used. The user then sends a single MMS message to the telephone subscriber number +33123456 in the normal manner.

The telephone subscriber number +33123456 corresponds to the PTT session manager 210 which has a suitable MMS interface to enable it to receive and transmit MMS messages. The PTT session manager 210 thus receives the MMS message and extracts therefrom the telephone subscriber number of the originator of the message. The PTT session manager 210 performs a suitable address translation of the extracted telephone subscriber number to retrieve the corresponding SIP URI of the originator of the message. Such an address translation service could be provided in a variety of different ways, such as using a suitable DNS-type server, as will be appreciated by those skilled in the art.

Using the obtained SIP URI of the originator of the MMS message the PTT session manager is able to determine which of the 'dummy' participants the PTT session manager is managing is currently participating in a session with the originator of the MMS message. In other embodiments, the PTT session manager 210 may use a separate telephone subscriber number for each session managed thereby, thereby removing the need for the PTT session manager to store and maintain internal tables mapping message originators to sessions.

Once this is established, and as mentioned previously, the PTT server is able to determine the list of current participants to that session since this information is directly available to the PTT session manager. For example, in SIP-based system, each SIP message may contain the SIP URIs of each participant of the session.

Once the details of all the participants are obtained, the PTT session manager performs a suitable address resolution of the obtained SIP URIs, as described above, to obtain the corresponding telephone subscriber numbers of each of the current participants. The PTT session manager 210 then sends the original MMS message through the MMS system 208 to the obtained telephone subscriber numbers in the normal manner.

In this way, a participant of a PTT session may initiate a new communication service with the current participants of the PTT session in a simple and effective manner, thereby allowing, for example, a PTT session to be 'shared' with a different communication service.

Figure 3:
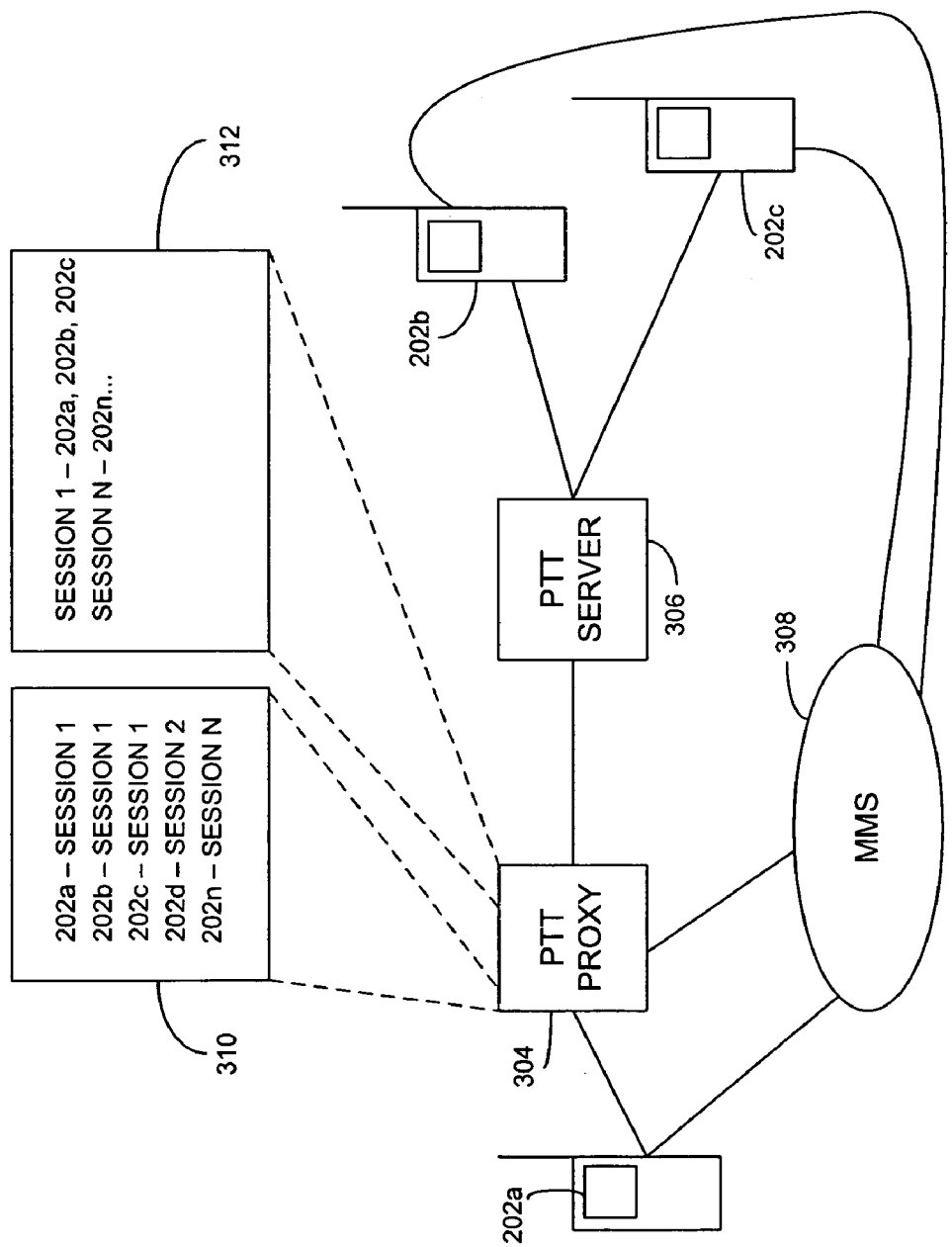
FIG. 3 is a block diagram showing a communication system according to another exemplary embodiment of the present invention.

A further exemplary embodiment will now be described with reference to FIG. 3.

The user of mobile telephone 202a creates a PTT session with mobile telephones 202b and 202c by sending an invite message to the PTT server 306. This message is forwarded, via a PTT proxy 304, to the PTT server 306 which establishes the PTT session with mobile telephones 202b and 202c in the normal manner. For each PTT session created the PTT server 306 allocates a substantially unique session identifier.

PTT proxy 304 obtains, from the information contained in each SIP message handled by the proxy 304, the session ID of the session created by mobile telephone 202a and the SIP URIs of the other participants of the session. With this information the PTT proxy 304 creates tables 310 and 312.

Table 310 contains details of addressing information, such as a SIP URI, relating to each mobile telephone currently involved in a PTT session along with the corresponding session ID of the session. Table 312 contains details of, for each PTT session ID, addressing information, such as a SIP URI, for each of the participants to the session.

Tables 310 and 312 are kept up-to-date as the PTT server 306 is arranged to notify the PTT proxy, for example through use of a suitable subscribe mechanism, of any additions or removals from each session.

Each of the mobile telephones 202a, 202b and 202c are configured to contain, store or otherwise make available, an entry in the electronic address book called, for example "Current Session". The entry "Current Session" has a predetermined telephone subscriber number, for example +33123456, which is used to address a suitable MMS client application on the PTT proxy 304. Each mobile telephone may be configured in this way either manually by the user of the mobile telephone, or alternatively may be configured by the manufacturer or network provider, for example through a group and list management server (GLMS). The telephone subscriber number allocated for the entry "Current Session" can be the same for all subscribers, although it is equally possible that different telephone subscriber numbers be allocated for different subscribers, or different groups of subscribers.

Whilst participating in a PTT session, if the user of mobile telephone 202a wishes to send an MMS message to all the current participants of the session, the user opens the MMS message client application, creates the message, and sends an MMS message to the telephone subscriber number of the aforementioned contact "Current Session". Since MMS client applications are generally designed to interrogate the electronic address book, this operation is simple for the user to perform.

The MMS system 308 sends the MMS message to the telephone subscriber +33123456. The PTT proxy 304 receives the MMS message and extracts the telephone subscriber number of the originator of the message, in this case mobile telephone 202a. The PTT proxy performs an appropriate address resolution on the originator telephone subscriber number, as described above, and obtains the SIP URI of the originator of the message, in this case the SIP URI of the mobile telephone 202a.

The PTT proxy 304 determines, through table 310, to which session the mobile telephone 202a is participating in, in this case session 1. From table 312, the PTT proxy 304 retrieves details of the SIP URIs of each of the participants of session 1.

The PTT proxy 304 performs an address resolution on the retrieved SIP URIs to obtain the telephone subscriber numbers for the participants in session 1, and uses this information to request the MMS system 308 to resend the originally sent MMS message to each of the participants of the current session, i.e. mobile telephones 202b and 202c. The MMS message can be sent to all of the determined participants, although it will be appreciated that, for example due to network problems or constraints, it may not be possible for all of the participants to receive the MMS.

Although the above embodiments have been described above with reference to a initiating an MMS communication whilst participating in a PTT session, those skilled in the art will appreciate that the inventive concepts described herein are in no way limited thereto. For example, the same or similar concepts may be applied to other session-based and session-less communication services such as instant messaging, conferencing, SMS, and any other suitable communication services. Use of the term mobile telephone is not limited thereto, and use of any suitable communication devices, such as personal digital assistants, personal computers, and the like, may be used.

What is claimed is:

1. A method to enable a first participant of a communication session established using a first communication service to initiate a communication with at least a second participant of the communication session using a second communication service, the method comprising:

receiving, at a communication node from the first participant of the communication session established using the first communication service and at a predetermined address, a message according to the second communication service, wherein the second communication service is a session-less service, and wherein the predetermined address identifies a participant of the communication session;

in response to the message, determining, by the communication node, at least one identifier of at least the second participant of the communication session; and sending, by the communication node, the message to the at least one identifier of at least the second participant.

2. A method according to claim 1, further comprising, upon establishing the communication session, adding a dummy or pseudo participant to the communication session, the participant identified by the predetermined address being the dummy or pseudo participant.

3. A method according to claim 1, further comprising, making available to a communication device of each participant of the communication session the predetermined address.

4. A method according to claim 1, wherein determining the at least one identifier of at least the second participant comprises determining, from the received message, the communication session associated with the message.

5. A method according to claim 1, wherein the first communication service is a session-based communication service.

6. The method according to claim 1, wherein the communication session established using the first communication service is a push-to-talk (PTT) session, and wherein the message according to the session-less service is one of a short message system (SMS) service and a multimedia message (MMS) service.

7. The method according to claim 1, wherein the participant identified by the predetermined address is a dummy participant of the communication session.

8. The method according to claim 1, wherein the message received at the predetermined address causes a second communication service application to be invoked at the communication node, wherein the second communication service application is different from a first communication service application for establishing the communication session.

9. The method according to claim 8, wherein the first communication service application is a push-to-talk (PTT) application, and wherein the second communication service application is an application for one of a short message system (SMS) service and a multimedia message (MMS) service.

10. A system for enabling a first participant of a communication session established using a first communication service to initiate a further communication with at least a second participant of the communication session using a second communication service, the system comprising:
   a receiving module for receiving, from the first participant of the communication session established using the first communication service, a message according to the second communication service at a predetermined address, wherein the second communication service is a session-less service, and wherein the predetermined address identifies a participant of the communication session; and
   processing logic operatively coupled to the receiving module to:
      in response to the message, determine at least one identifier of at least the second participant of the communication session; and
      send the message to the at least one identifier of at least the second participant using the second communication service.

11. A system according to claim 10, further comprising, a session control manager for, upon establishment of the communication session, adding a dummy or pseudo participant to the communication session, the participant identified by the predetermined address being the dummy or pseudo participant.

12. A system according to claim 11, wherein the session control manager is configured to make available to a communication device of each participant of the communication session the predetermined address.

13. A system according to claim 10, wherein the processing logic is configured to determine, from the message, the communication session and current participants of the communication session.

14. A system according to claim 10, wherein the first communication service is a session-based communication service.

15. The system according to claim 10, wherein the communication session established using the first communication service is a push-to-talk (PTT) session, and wherein the message according to the session-less service is one of a short message system (SMS) service and a multimedia message (MMS) service.

16. The system according to claim 10, wherein the participant identified by the predetermined address is a dummy participant of the communication session.

17. The system according to claim 10, wherein the message received at the predetermined address causes a second communication service application to be invoked at the system, wherein the second communication service application is different from a first communication service application for establishing the communication session.

18. The system according to claim 17, wherein the first communication service application is a push-to-talk (PTT) application, and wherein the second communication service application is an application for one of a short message system (SMS) service and a multimedia message (MMS) service.

* * * * *